G. B. WINTER.
MOTOR CAR WHEEL.
APPLICATION FILED OCT. 22, 1906.
942,025.
Patented Nov. 30, 1909.
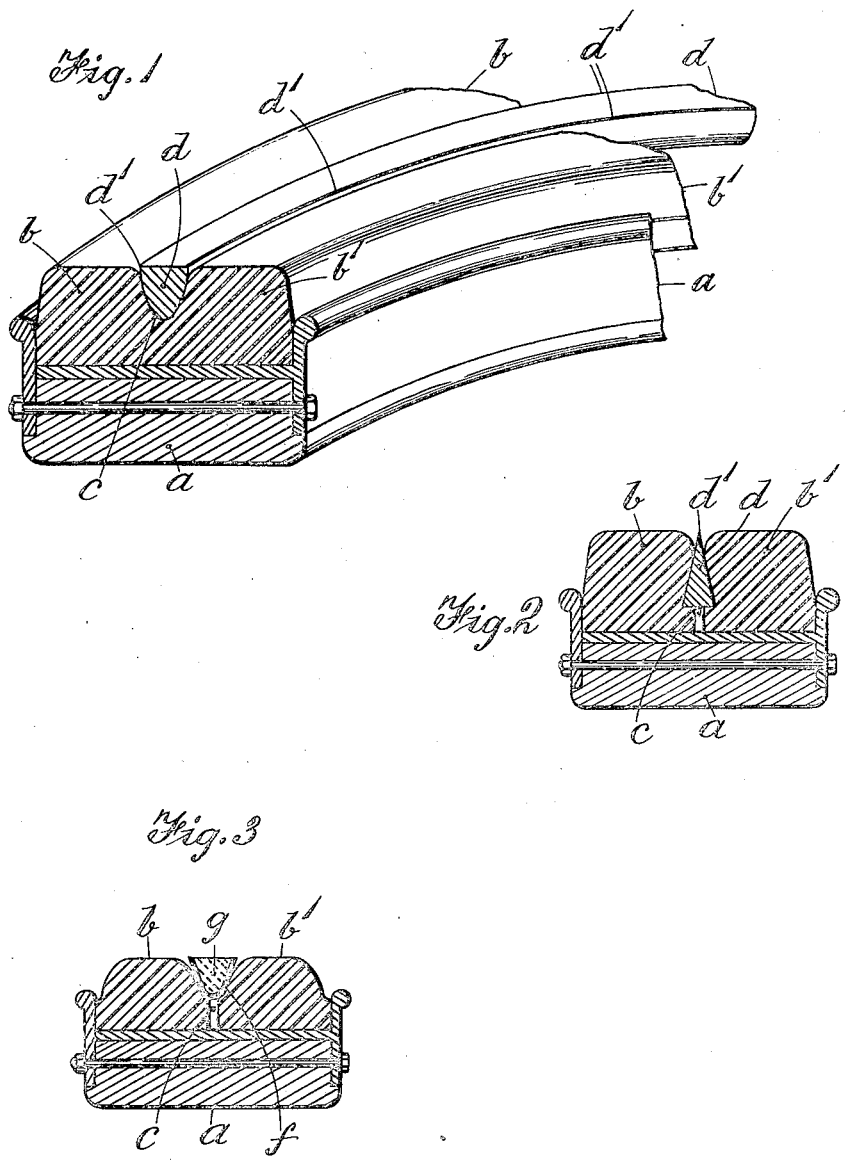

UNITED STATES PATENT OFFICE.

GEORGE BIRTCHNELL WINTER, OF LONDON, ENGLAND.

MOTOR-CAR WHEEL.

942,025. Specification of Letters Patent. Patented Nov. 30, 1909.

Application filed October 22, 1906. Serial No. 340,101.

*To all whom it may concern:*

Be it known that I, GEORGE BIRTCHNELL WINTER, a subject of the King of Great Britain, of 39 Conduit street, London, in the county of Middlesex, England, have invented a new and useful Improvement in the Wheels of Motor-Cars, of which the following is a specification.

In motor-cars, especially in heavy vehicles such as motor-omnibuses, there is found to be considerable liability to side slip of the outer tires of the wheels, which ordinarily consist of india rubber, such side-slip being not only inconvenient but often highly dangerous.

My present invention has for its object a novel method of construction of the wheel tires of such vehicles, by which the liability of side-slip is greatly reduced or entirely prevented.

The accompanying drawing is in illustration of my invention.

Figure 1 shows in transverse section, part of the outer rim and tire of a wheel. Fig. 2 is a transverse section of a slightly modified form of a tire shown in Fig. 1. Fig. 3 shows in transverse section, a somewhat different form of the device shown in Fig. 1.

The outer tire $a$ (see Fig. 1) of such vehicles as those mentioned above is frequently made to consist of a solid india rubber block $b$ as shown in Fig. 1, or of two india rubber surfaces or treads $b$, $b'$ side by side, as shown in Fig. 2, and their operating surfaces separated by a narrow groove or space $c$ between them, for their full depth, or partly, and by my invention I fit in this space $c$ or in the body of the tire itself if there is no such dividing space, a ring $d$, of steel or other metal, extending completely around the wheel. This ring $d$ is made preferably more or less triangular in cross section, as shown, two of its angles at $d'$ being directed outward, and projecting to the same level as the central tread of the india rubber tire, or slightly beyond it, so that in the event of any tendency to side-slip on the part of the wheel, one of the angular edges $d'$ of the ring $d$ has a tendency to engage with the surface of the ground instead of slipping over it, and thus the entire wheel is prevented from lateral movement, or side-slip, while the ring $d$ is sufficiently rigidly held by the india rubber. Or the ring may be made of one piece, separated at one point, the ends being held together in proper position, by its elasticity or by other means.

The details of the shape of the metal ring $d$ and the method of fixing it may be varied more or less. For instance instead of the angular ring extending completely around the wheel in one piece, it may be made of several separate pieces of any desired length, the ends of which may adjoin each other or may be separated by any desired distance.

The sides of the continuous ring $d$ first described may be embedded in or held by the adjoining sides of the two parallel india rubber surfaces $b$ $b'$ which form the sides of the recess $c$, and the inner part of the steel ring may be made of any desired shape to insure their being firmly held in position.

Two or more parallel steel rings, or parts of rings, may be used on the tire around the wheel, instead of one only.

The metal ring $a$ described and shown in Fig. 1 may be hollowed at its outer side the edges of the two sides projecting to the same level as the central tread of the india rubber tire or slightly beyond it as shown in Fig. 3, and the space between the sides $e$ may be filled with a softer metal or material $f$, the outer side of which, between the sides of the ring, runs upon the road, and wearing faster always leaves the harder edges of the sides of the ring projecting somewhat beyond it so that they are in contact with the road and tend to prevent side-slip, in the way already described.

My invention is applicable to all kinds of motor vehicle wheels, having india rubber tires or treads, the essential feature being the metal ring or rings having one or more edges level with or projecting slightly beyond the tread of the wheel, and embedded in the recess around the tire between the two parts of the latter, or otherwise fixed in the desired position on the tire.

Having fully described my invention, what I desire to claim, and secure by Letters Patent, is:—

1. In a wheel, the combination of a wheel rim and a wearing surface, said wearing surface extending outwardly some distance beyond said rim and being substantially flat, the outer edges of said wearing surface being made of rubber and the central part being a metal ring having sharp edges or corners, said metal ring being located within said wearing surface with its outer surface practically on a level with the rubber part of said surface, whereby, when the vehicle turns, the rubber on the outside of said wearing surface will yield and permit one of the sharp edges of the metal ring to contact with the road, thereby preventing skidding, substantially as described.

2. The combination of a tire rim, side rings secured thereto, two parallel rubber treads separated by a narrow space, held between said rings and extending outwardly a considerable distance beyond said rings, a metal ring angular in cross section, held between said treads, the outer part of the rubber treads and the metal ring forming a substantially flat wearing surface, substantially as described.

3. The combination of a tire, two parallel rubber treads secured thereto and extending outwardly some distance beyond the tire and separated by a narrow space, a metal ring angular in cross section, held in said space and in the sides of the rubber treads, the said ring and treads forming a substantially flat wearing surface, and a soft metal trough-shaped ring secured to said metal ring, whereby skidding is prevented, substantially as described.

In witness whereof I have hereunto set my hand in the presence of two witnesses.

GEORGE BIRTCHNELL WINTER.

Witnesses:
ARTHUR E. EDWARDS,
ALFRED G. BRATTON.